United States Patent
Heyen

(10) Patent No.: US 11,159,083 B2
(45) Date of Patent: Oct. 26, 2021

(54) METHOD FOR FEEDING IN AN ELECTRICAL ALTERNATING CURRENT

(71) Applicant: Wobben Properties GmbH, Aurich (DE)

(72) Inventor: Christian Heyen, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/518,747

(22) Filed: Jul. 22, 2019

(65) Prior Publication Data

US 2019/0348902 A1 Nov. 14, 2019

Related U.S. Application Data

(63) Continuation-in-part of application No. PCT/EP2018/051777, filed on Jan. 25, 2018.

(30) Foreign Application Priority Data

Jan. 25, 2017 (DE) ..................... 10 2017 101 359.8

(51) Int. Cl.
*F03D 9/00* (2016.01)
*H02P 9/04* (2006.01)
(Continued)

(52) U.S. Cl.
CPC ................ *H02M 1/12* (2013.01); *F03D 7/00* (2013.01); *H02J 3/386* (2013.01); *H02M 7/5387* (2013.01); *F03D 9/255* (2017.02)

(58) Field of Classification Search
CPC .... H02M 1/12; H02M 1/5387; H02M 7/5387; H02J 3/386; F03D 7/00; H03H 7/0153; H03H 7/70107; H03H 11/0405
(Continued)

(56) References Cited

U.S. PATENT DOCUMENTS 5,831,842 A 11/1998 Ogasawara et al.
8,587,279 B2 11/2013 Wang et al.
(Continued)

FOREIGN PATENT DOCUMENTS

DE 102008018497 A1 10/2009
DE 102012203015 A1 9/2012
(Continued)

*Primary Examiner* — Tulsidas C Patel
*Assistant Examiner* — Thomas K Quigley
(74) *Attorney, Agent, or Firm* — Seed IP Law Group LLP

(57) ABSTRACT

A wind power installation and a method for feeding a filtered alternating current into an electrical supply grid by the wind power installation are provided. The wind power installation includes at least one inverter having an inverter output for providing an inverter current. The at least one inverter is coupled at its inverter output to an active filter. The active filter filters the inverter current provided at the inverter output and provides the filtered alternating current for feeding into the electrical supply grid. The method includes providing the inverter current at the inverter output by switching at least one switch of the inverter, sensing the switching, and controlling the active filter based on the sensed switching to filter the inverter current provided at the inverter output and produce the filtered alternating current.

18 Claims, 5 Drawing Sheets

(51) Int. Cl.
   *H02M 1/12*      (2006.01)
   *F03D 7/00*      (2006.01)
   *H02J 3/38*      (2006.01)
   *H02M 7/5387*    (2007.01)
   *F03D 9/25*      (2016.01)

(58) Field of Classification Search
   USPC .................................................. 363/39, 43
   See application file for complete search history.

(56) References Cited

U.S. PATENT DOCUMENTS

| | | | |
|---|---|---|---|
| 9,252,682 | B2 | 2/2016 | Inoue |
| 2012/0087165 | A1 | 4/2012 | Esram et al. |
| 2013/0039100 | A1 | 2/2013 | Kazama et al. |
| 2014/0203559 | A1 | 7/2014 | Wagoner et al. |
| 2014/0268926 | A1 | 9/2014 | Gupta et al. |
| 2016/0285390 | A1 | 9/2016 | Rodriguez |
| 2017/0284370 | A1 | 10/2017 | Gensior |
| 2019/0052094 | A1* | 2/2019 | Pmsvvsv .................. H02J 3/46 |
| 2020/0381920 | A1* | 12/2020 | Runge ...................... H02J 3/18 |

FOREIGN PATENT DOCUMENTS

| | | | |
|---|---|---|---|
| DE | 102014219052 A1 | 3/2016 |
| JP | 200131165 A | 8/2001 |
| JP | 2003209973 A | 7/2003 |
| RU | 2286639 C1 | 10/2006 |
| WO | 2010079235 A2 | 7/2010 |
| WO | 2016/045963 A1 | 3/2016 |

\* cited by examiner

| A11 | A21 | A31 | Σ | SF($U_{DC}$;$I_{SOLL}$) |
|---|---|---|---|---|
| +1 | +1 | +1 | +3 | -1 |
| +1 | +1 | -1 | +1 | -1 |
| +1 | -1 | +1 | +1 | +1 |
| +1 | -1 | -1 | -1 | +1 |
| -1 | +1 | +1 | +1 | +1 |
| -1 | +1 | -1 | -1 | -1 |
| -1 | -1 | +1 | -1 | +1 |
| -1 | -1 | -1 | -3 | -1 |

Fig. 5

METHOD FOR FEEDING IN AN ELECTRICAL ALTERNATING CURRENT

BACKGROUND

Technical Field

The present invention relates to a method for feeding an electrical alternating current into an electrical supply grid by means of a wind power installation and to a wind power installation which comprises at least one inverter with an inverter output, which is coupled to an active filter.

Description of the Related Art

It is particularly known for wind power installations to generate electrical alternating current by using electrical inverters and to a feed electrical alternating current into the electrical supply grid by means of electrical inverters.

For this purpose, wind power installations usually have at least one electrical generator for generating an electrical alternating current. For feeding into the electrical supply grid, the electrical alternating current generated by the generator is then rectified by means of at least one inverter in such a way that the electrical alternating current generated by the generator then meets the requirements of the electrical supply grid.

The electrical inverter is in this case usually of a multi-phase form and, in wind power installations that have a high power output, is usually of a modular design, i.e., the inverter has a multiplicity of inverter modules, which together form the electrical inverter.

However, electrical inverters also have a series of disadvantages, for example, the electrical alternating current provided by an electrical inverter has a high harmonic content, i.e., the electrical alternating current or the electrical inverter current has a large number of harmonics of different orders, which are undesirable from the viewpoint of the electrical supply grid.

In order to minimize such, in particular undesired harmonics, active or passive filters, for example, may be provided or arranged at the output of the electrical inverter, the object of which is to filter out the undesired harmonic or to smooth the alternating current provided by the electrical inverter.

In the simplest case, passive filters are formed by a combination of capacitances, impedances and/or inductances. Passive filters therefore comprise a combination of passive components, to be specific capacitors, resistors and/or coils. Usually, such passive filters are also configured once for their area of use.

Active filters additionally have at least one further active component, that is to say a component which is controllable and, in the case of an active filter, is also controlled. This active component may, for example, be a power circuit-breaker, that is to say an IGBT or a MOSFET. Moreover, active filters are initialized once for their area of use and appropriately re-configured in the course of operation; their control is therefore continuously newly adapted to their area of use.

A disadvantage of the previously known filters is, in particular, the restricted operating range in the case of passive filters or the high signal transit times in the case of active filters, which have the effect that, in spite of these precautions, the electrical alternating current generated by the generator, rectified by the inverter and filtered by the filter has harmonics that do not meet the requirements of the electrical supply grid, in particular in countries with high requirements which in particular have a weak electrical supply grid, such as, for example, Brazil.

The German Patent and Trademark Office has searched the following prior art in the priority application relating to the present application: DE 10 2012 203 015 A1, DE 10 2014 219 052 A1, US 2013/0039100 A1, U.S. Pat. No. 5,831,842 A and JP 2003-209 973 A.

BRIEF SUMMARY

Provided is a method that allows filtering of an electrical alternating current or an electrical inverter current in a way suitable for wind power installations.

A method for feeding an electrical alternating current into an electrical supply grid by means of a wind power installation is proposed. Accordingly, the wind power installation comprises at least one inverter with an inverter output for providing an electrical inverter current and an active filter coupled to the inverter output.

The inverter is consequently designed to provide or deliver an inverter current, in particular a multiphase inverter current, at its inverter output.

The active filter is also designed to filter the inverter current provided at the inverter output, in particular in order thereby to provide a filtered alternating current for feeding into the electrical supply grid or to feed this alternating current into the electrical supply grid, preferably by means of a transformer. The active filter is consequently preferably arranged between the at least one electrical inverter and the electrical supply grid.

Particularly preferably, the wind power installation has for this a full converter concept, a full converter concept being supposed to be understood as meaning in particular that the entire electrical current generated by the wind power installation is passed by way of an inverter or an arrangement of a number of inverters or inverter modules in such a way that the entire current fed into the electrical supply grid has been passed through this inverter or this arrangement of a number of inverters or inverter modules.

In a first step, the electrical inverter thus provides an inverter current at its output by switching actions of at least one switch. The inverter consequently rectifies the current generated by the generator or part thereof, in order to provide or deliver an alternating current at the inverter output. The inverter current thus provided at the inverter output is in this case in particular a three-phase alternating current.

For this, the electrical inverter is preferably of a three-phase form and has for generating the electrical inverter current at least one upper switch and one lower switch for each of the phases. The switches of the inverter may in this case be activated, for example, by way of a tolerance band method, in order to generate the inverter current or provide it at the inverter output.

Irrespective of the type of control method, in this case the control of the inverter or the control of the switches of the inverter is undertaken by a controller, which activates the switches of the inverter by means of activation signals in such a way that a corresponding inverter current is established at the inverter output.

In a second step, the switching actions of the inverter are sensed. Therefore, the switching actions of the individual switches of the inverter are monitored. This may take place, for example, by directly sensing a switching state of the corresponding switch or by picking off the activation signals that are transmitted from the controller to the switches. If, for example, the controller sends an activation signal to a switch of the inverter, this signal is picked off and in particular fed or transmitted to the active filter. Preferably, the active filter consequently receives the same signals as the switches of the electrical inverter.

Subsequently, the active filter is controlled in dependence on the sensed switching actions, in order to filter the inverter current provided by the inverter at the inverter output, in particular in order thereby to obtain a filtered alternating current.

The alternating current thus obtained or filtered may then, for example, be superposed with further alternating currents and fed by way of a transformer into a wind farm grid and/or an electrical supply grid.

It is consequently proposed in particular that the active filter is controlled directly in dependence on the activation signals for the switches of the inverter. The inverter or the controller of the inverter therefore preferably provides the active filter with the activation signals for the switches, for example, directly with the same signal or more preferably indirectly by picking off the activation signals. Such a procedure has the effect that there are almost the same signal transit times between the controller of the inverter and the switches of the inverter and between the controller of the inverter and the active filter. Such a construction or such a procedure allows in particular a possibility of filtering an inverter current with which there are no time delays in the control signals between the alternating current to be filtered and the active filtering. The active filter is consequently designed to filter an inverter current provided by an inverter without having to measure it.

It is particularly advantageous here furthermore that the active filter does not have to be initialized and reconfigured as in the case of previously known methods or that the current has to be continuously measured in order to sense the deviations from a setpoint value.

The method consequently allows in particular an active filter to be controlled in such a way that the harmonics of an inverter current are minimized, without the alternating current provided by the inverter having to be measured or the active filter having to be initialized and reconfigured. Consequently, the proposed method at least creates a possibility for filtering harmonics in the case of which the active filter only has to be initialized once. Initialization should be understood here as meaning in particular the configuration of the active filter for the first time in conjunction with the corresponding inverter or inverters.

Preferably, the controlling of the active filter takes place in such a way that the electrical alternating current fed into the electrical supply grid has a reduced harmonic component as compared with the electrical inverter current.

The active filter is consequently controlled in such a way that the filtered alternating current that is fed into the electrical supply grid has less harmonics than the inverter current provided by the inverter. In this way, for example, all of the harmonics of the inverter current provided or only certain harmonics of the inverter current provided may be minimized.

Consequently, a possibility of minimizing harmonics specifically and as and when required is provided. For example, the active filter may be designed to filter harmonics of the third order; accordingly, the harmonics of other orders are then the same and/or even greater.

The active filter is consequently preferably able to be configured and/or able to be initialized in dependence on the electrical supply grid or the requirements of the electrical supply grid. This is particularly advantageous with regard to different national or regional requirements, since all that is required for setting up a wind power installation at any desired location is for the active filter to be initialized once.

Preferably, the switching actions of the at least one switch have a switching frequency and the sensing of the switching actions takes place with a sampling frequency, the sampling frequency being at least twice, in particular at least five times, preferably at least ten times, the switching frequency of the switching action to be sensed of the switch.

For providing the electrical alternating current at the inverter output, the switches of the electrical inverter have, for example, a switching frequency of 2 kHz. The switches of the inverter consequently receive at least 2000 activation signals per second transmitted from the controller of the inverter. The activation signals themselves are then sampled by means of a sampling frequency or sent to the active filter with an increased or higher frequency, which is at least twice the switching frequency, preferably ten times the switching frequency.

Preferably, the controlling of the active filter takes place depending on an activation signal initiating the switching actions of the at least one switch and also or alternatively the controlling of the active filter takes place depending on a control voltage initiating the switching actions of the at least one switch.

Consequently, the active filter preferably senses the activation signals of the switches of the inverter or the active filter receives the activation signals for the switches of the inverter transmitted directly by the controller of the inverter. The active filter is consequently controlled with the same signals as the switches of the inverter.

Also or alternatively, the controlling of the active filter may also take place in dependence on a control voltage of the switches, for example, the gate voltage of the semiconductor may be sensed or measured for this.

Preferably, the at least one inverter is activated by means of a tolerance band method in order to provide the inverter current at the inverter output, and the active filter filters the current the inverter current depending on the switching actions of the at least one switch that are generated by the tolerance band method.

The electrical inverter is consequently activated in dependence on a tolerance band method or controlled by a tolerance band method.

In the tolerance band method, a tolerance band that has a lower band limit and an upper band limit is placed around a sinusoidal function, which corresponds to the desired output current of the inverter. For carrying out the tolerance band method, furthermore, the generated output current is sensed and compared with the tolerance band, that is to say the lower and upper band limits. If the current is in the positive half-wave and reaches the lower band limit, a switching pulse is initiated by means of an activation signal and the corresponding switch of the inverter changes the output current. If the sensed output current then reaches the upper band limit, the switching pulse is ended by means of a further activation signal. If the current is in the negative half-wave and reaches the upper band limit, a switching pulse is initiated by a further activation signal and the corresponding switch of the inverter changes the output current. If the sensed output current then reaches the lower band limit, the switching pulse is ended by means of a further activation signal. As a result, the current varies within the tolerance band in a pattern that follows the prescribed, idealized sinusoidal waveform, the switches of the inverter continually going on and off again. The switches have in this case a variable switching frequency, which substantially depends on the width of the tolerance band.

It is particularly advantageous when using a tolerance band method that the amplitudes occurring of the harmonics of the inverter current lie below 1% with respect to the rated current, and the active filter consequently has to filter far less great current peaks than, for example, in the case of a pulse-width-modulated inverter current.

Consequently, particularly advantageous synergies are obtained for the method with respect to inverters that are controlled by means of a tolerance band method. For example, an active filter with the same overall size can be used for filtering a number of inverter currents generated by a tolerance band method.

Preferably, the controlling of the active filter takes place without taking into account the inverter current provided.

The active filter is consequently controlled independently of the inverter current generated. The active filter therefore has no primary means for sensing the inverter current generated. Also, the active filter preferably has no input of which the input variable is the generated inverter current. Nevertheless, the generated inverter current may be sensed for carrying out the tolerance band method. However, it is then not passed on to the active filter for carrying out the method.

Preferably, the controlling of the active filter takes place in dependence on the sensed switching actions in order to reduce at least one harmonic component of the first alternating current, in particular to minimize a current harmonic component of the first alternating current, preferably to reduce a current harmonic component selected from the list comprising: 1st current harmonic to 60th current harmonic.

The active filter is consequently designed to reduce at least one harmonic component. Moreover, the active filter is designed in such a way that it attenuates frequencies of a certain spectrum, in particular harmonics up to the 60th current harmonic. Preferably, the active filter is consequently designed to filter harmonics up to 3 kHz, that is to say the 60th harmonic of a fundamental frequency of 50 Hz.

This is so because it has been recognized furthermore that the method or the construction of the filter is particularly favorable for the harmonics up to the 60th order.

Preferably, the electrical inverter comprises a number of inverter modules with an inverter module output for providing an inverter module current, and the inverter module outputs are interconnected in such a way that their inverter module currents are superposed to form the inverter current, a collective evaluation device being provided for sensing and evaluating activation signals of the number of inverter modules, and the collective evaluation device activating the active filter for filtering the inverter current.

The inverter is consequently constructed from a number of modules. The modules themselves may in turn be formed by a complete inverter, so that at least one inverter should be understood as also meaning a multiplicity of inverters.

Moreover, the active filter is designed to filter an inverter current superposed from a number of inverter currents. Provided for this in particular is a collective evaluation device, which receives the activation signals of all the inverters or inverter modules to be filtered. For example, three inverters or three inverter modules are filtered by an active filter. If each inverter has 6 switches, the collective evaluation device receives 18 activation signals. The activation signals are then evaluated within the collective evaluation device, for example, by means of a look-up table, in order to activate the active filter correspondingly in order that it filters the overall current. Preferably, for this the collective evaluation device senses the switching states of the individual switches of the inverter modules.

Preferably, the active filter is controlled in dependence on the sensed switching actions and at least additionally in dependence on a DC link voltage of the at least one inverter and/or a current setpoint value for the at least one inverter.

Consequently, the active filter additionally senses the DC link voltage and preferably the current setpoint value for the at least one inverter. In this way it is made possible in particular by means of the active filter to react more specifically to ripple currents and/or to tune the active filter more specifically to the at least one inverter.

Also proposed is a wind power installation, comprising at least one inverter with an inverter output for providing a first alternating current and an active filter coupled to the inverter output for filtering the inverter current, in order to create a filtered alternating current for feeding into the electrical supply grid, the active filter being designed to be controlled in dependence on a sensed switching action of at least one switch of the inverter, in order to filter the first alternating current and thereby create the filtered alternating current.

The wind power installation consequently has at least one inverter, which provides an inverter current, which is generated, for example, by means of a tolerance band method. At the output of the inverter there is also arranged an active filter, which is designed to filter the alternating current provided at the output of the inverter in dependence on the switching actions of the switches of the inverter.

Consequently proposed in particular is a wind power installation which is designed to carry out a method described above or below for feeding in an electrical alternating current.

Preferably, the wind power installation also has a wind power installation transformer, which is designed to step up the alternating current filtered by the active filter to a supply grid voltage or wind farm grid voltage. For example, the inverter current has a voltage of 1 kV and the wind farm grid voltage is 10 kV. The transformation ratio of the wind power installation transformer is then 1:10.

Preferably, the wind power installation has a controller for activating the inverter, in order to carry out a method described above or below.

The wind power installation consequently comprises a controller which is designed to activate the inverters and in particular the switches, preferably the upper and lower switches, of the inverters, in order to provide an inverter current at the inverter output.

For this purpose, the controller transmits in particular activation signals to the inverter or the switches of the inverter or of the inverter modules, the activation signals preferably likewise being transmitted to the active filter, in order to filter the inverter current of the inverter or of the inverter modules provided at the inverter output and thereby create the filtered alternating current.

Preferably, the at least one inverter has at least 6 switches, two switches respectively, in particular an upper switch and a lower switch, providing a current for a phase in each case of the inverter current.

The inverter or the inverter modules are consequently configured to provide a three-phase alternating current at the output, two switches being respectively provided for a phase.

Preferably, the at least one switch of the inverter or the switches of the inverter is/are formed as IGBTs or MOSFETs.

The switches of the inverter are consequently designed to operate with particularly high switching frequencies, in order to provide an inverter current that corresponds substantially to an idealized sinusoidal waveform or the deviations of which from an idealized sinusoidal waveform are on average less than 5% with respect to the rated current.

The inverter is consequently also configured to be activated by means of a tolerance band method, the switches of the inverter having, for example, a switching frequency of up to 20 kHz.

Preferably, the at least one inverter is activated by means of a tolerance band method and the active filter filters the inverter current depending on the switching actions of the at least one switch that are generated by the tolerance band method.

Preferably, the inverter is a power inverter, in particular a power inverter that is designed to be used in a full converter concept of a wind power installation.

The inverter is consequently designed to rectify electrical power outputs particularly of up to 8 MW. For this, the inverter is, for example, constructed in a modular manner, i.e., it has a number of inverter modules, which are preferably interconnected parallel to one another in order to provide an inverter current. This inverter current, provided in this way, is then filtered with the active filter. Preferably, the wind power installation has precisely one active filter. However, it is also conceivable for there to be a number of active filters, for example, if the wind power installation has a number of structurally identical inverters which are respectively accommodated in a power cabinet. Then, alternatively, each power cabinet has an active filter. Preferably, the number of active filters is chosen such that the alternating current fed into the electrical supply grid from the wind power installation meets the requirements of the electrical supply grid.

Preferably, the active filter has at least one active component, in particular at least one IGBT or one MOSFET, preferably at least one silicon-carbide IGBT or one silicon-carbide MOSFET, which is designed to operate with a clocking frequency which is preferably greater than the switching frequency of the at least one switch or which is greater than the switching frequency of the switches multiplied by the number of inverter modules of the inverter.

The clocking frequency of the active component is consequently adapted to the number of switches of the inverter or of the inverter modules, the inverter current of which the active filter is intended to filter.

It has been recognized here that the clocking frequency must be increased both with the switching frequency of the switch and with the number of switches of the inverter, in order to generate a filtered alternating current that meets the requirements of the electrical supply grid.

In particular, it is proposed for this that the clocking frequency of the active component must be greater than the switch frequency of the switches multiplied by the number of inverter modules.

Preferably, for this purpose the switch or switches of the active filter is/are formed by silicon-carbide IGBTs or silicon-carbide MOSFETs or other transistors which can in particular be operated with clocking or switching frequencies above 20 kHz. If, for example, the active filter is responsible for 5 inverters, the switches of which are respectively operated at 20 kHz, the active filter, in particular the switch of the active filter, has a clocking or switching frequency of greater than 100 kHz. The switching frequency of the active filter consequently corresponds to at least N times the switch frequency of the N inverters.

Preferably, the electrical inverter comprises a number of inverter modules with an inverter module output for delivering an inverter module current, and the inverter module outputs are interconnected in such a way that their inverter module currents are superposed to form the inverter current, a collective evaluation device being provided for sensing and evaluating activation signals of the inverter modules, and the collective evaluation device activating the active filter for filtering the inverter current.

The wind power installation consequently has a number of inverters or a number of inverter modules of which the output currents are filtered by means of an active filter.

Provided for this purpose is a collective evaluation device, which senses and evaluates all of the activation signals of the corresponding inverters or inverter modules.

Moreover, the collective evaluation device is configured to control the active filter in dependence on the sensed activation signals in such a way that the inverter current filtered by the active filter has fewer harmonics than the inverter current provided by the inverter.

This may take place, for example, by means of a look-up table or a control table that has been initialized once while taking into account the number of inverters or inverter modules.

Preferably, the active filter is interconnected with the inverter output in parallel in such a way that the active filter is designed to filter, in particular to reduce, at least one current harmonic of the first alternating current.

The active filter is consequently configured to filter current harmonics.

BRIEF DESCRIPTION OF THE SEVERAL VIEWS OF THE DRAWINGS

The present invention is now explained in more detail below, by way of example, on the basis of exemplary embodiments with reference to the accompanying figures.

DETAILED DESCRIPTION

Figure 1:
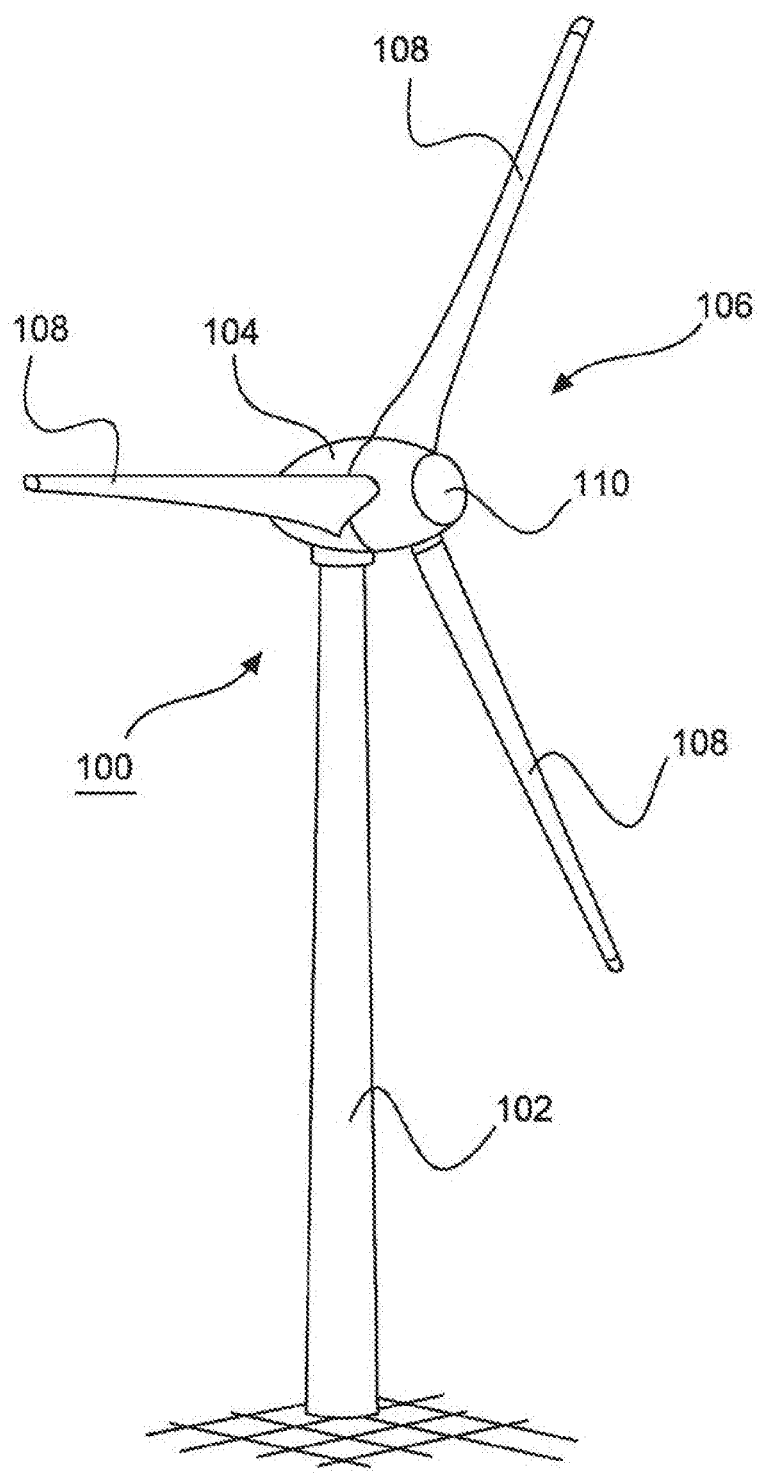
FIG. 1 shows a schematic view of a wind power installation according to one embodiment.

FIG. 1 shows a wind power installation 100 for feeding electrical alternating current into an electrical supply grid.

For this purpose, the wind power installation 100 has a tower 102 and a nacelle 104. An aerodynamic rotor 106 with three rotor blades 108 and a spinner 110 is arranged on the nacelle 104. The rotor 106 is caused to rotate by the wind during operation and thereby drives a generator in the nacelle 104, the generator preferably being in the form of a 6-phase ring generator.

Figure 2:
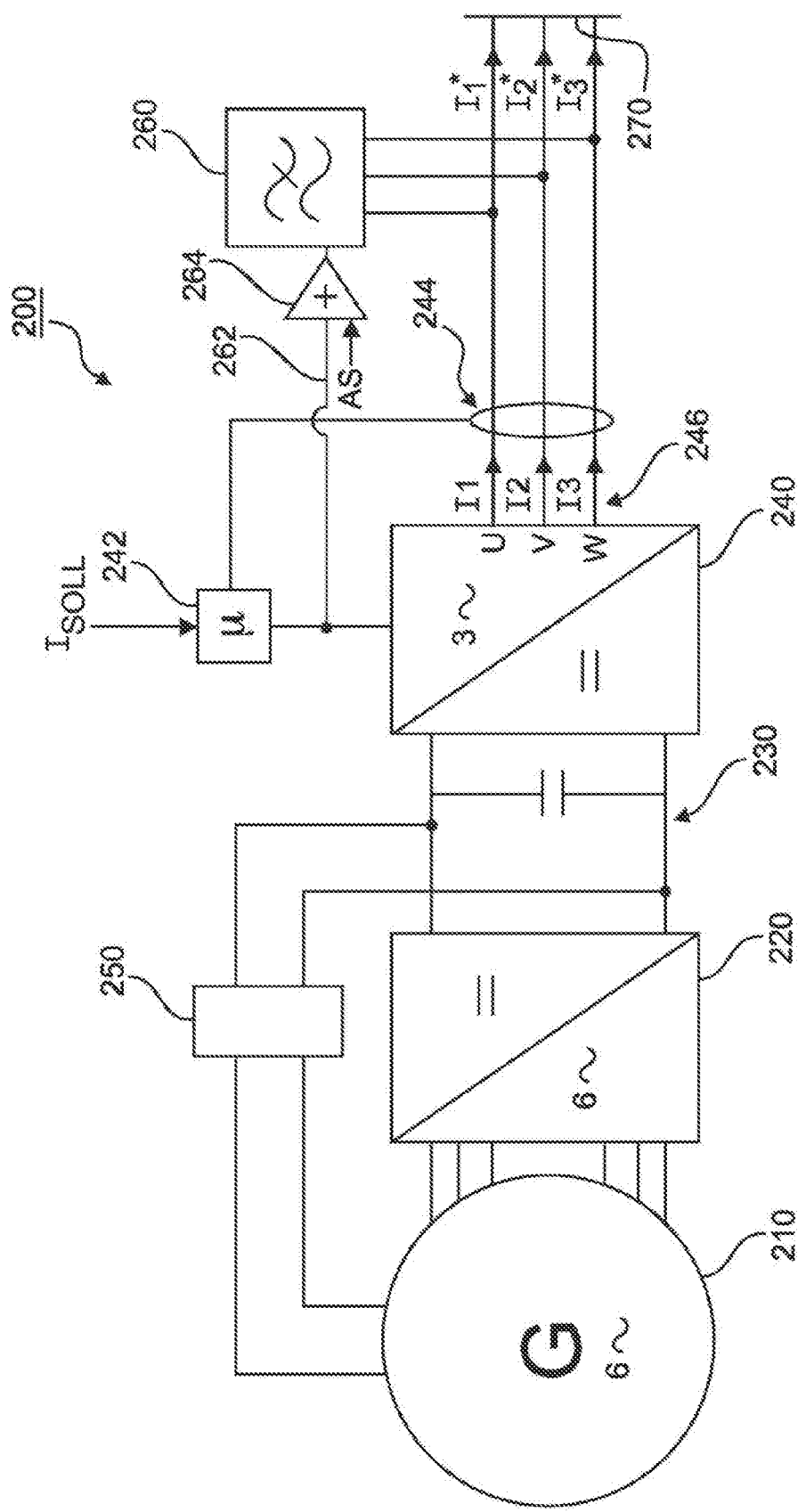
FIG. 2 shows a schematic construction of an electrical section of a wind power installation for feeding in an electrical alternating current according to one embodiment, FIG. 3 schematically shows the construction of an inverter for providing an inverter current by means of a tolerance band method, FIG. 4 schematically shows the coupling of the active filter to the switches of a number of inverter modules and FIG. 5 schematically shows a control table of a collective evaluation device.

FIG. 2 shows, in a simplified manner, an electrical section 200 of a wind power installation shown in FIG. 1.

The electrical section 200 has a 6-phase ring generator 210, which is caused to rotate by the wind by way of a mechanical drive train of the wind power installation in order to generate a 6-phase electrical alternating current.

The 6-phase electrical alternating current is transferred from the generator 210 to the rectifier 220, which is interconnected with the 3-phase inverter 240 by way of a DC voltage link 230.

The 6-phase ring generator 210, which is in the form of a synchronous generator, is electrically excited in this case by way of the excitation 250 from the DC voltage link 230.

The electrical section 200 consequently has a full converter concept, in which the grid 270 is fed by means of the 3-phase inverter 240. This grid 270 is usually a wind farm grid, which feeds into an electrical supply grid by way of a wind farm transformer. However, feeding directly into the electrical supply grid instead of the farm grid 270 also comes into consideration.

Furthermore, a transformer may also be provided for feeding into the grid 270.

To generate the three-phase current $I_1$, $I_2$, $I_3$ for each of the phases U, V, W, the inverter 240 is controlled with a tolerance band method. In this case, the control takes place by way of the controller 242, which senses each of the three currents $I_1$, $I_2$, $I_3$ provided or generated by the inverter 240 at the inverter output 246 by means of a current sensor 244.

The controller is consequently designed to control each phase of the inverter individually by means of the current sensor 244. For this purpose, the controller 242 may prescribe a current setpoint value Isoll, in dependence on which the currents $I_1$, $I_2$, $I_3$ are controlled. The current setpoint value Isoll is preferably individually calculated and prescribed for each phase U, V, W internally in the installation. The currents $I_1$, $I_2$, $I_3$ thus generated are also referred to as an inverter current or inverter currents.

The inverter 240 is also coupled at its inverter output 246 to an active filter 260, in order to filter the inverter current $I_1$, $I_2$, $I_3$ provided at the inverter output 241 and thereby provide a filtered alternating current $I^*_1$, $I^*_2$, $I^*_3$ for feeding into the electrical supply grid.

For this, the active filter 260 is controlled in dependence on the sensed switching actions of the switches of the inverter 240. That the active filter 260 is controlled in dependence on these switching actions is indicated by the signal line 262, which transfers the activation signals of the controller 242 to the switches of the inverter 240 also to the active filter 260.

Also provided is a collective evaluation device 264, which is designed to sense the activation signals by means of the signal line 262 and further signal AS, such as, for example, the DC link voltage $U_{DC}$ and the current setpoint value $I_{soll}$, and evaluate them. The collective evaluation device 264 then activates the active filter 260 in dependence on the activation signals thus sensed and evaluated and further signals AS.

In order in particular to filter current harmonics up to the 60th order, the active filter 260 has low-pass characteristics, the active filter 260 being controlled by means of the activation signals for the switches of the inverter 240.

Figure 3:
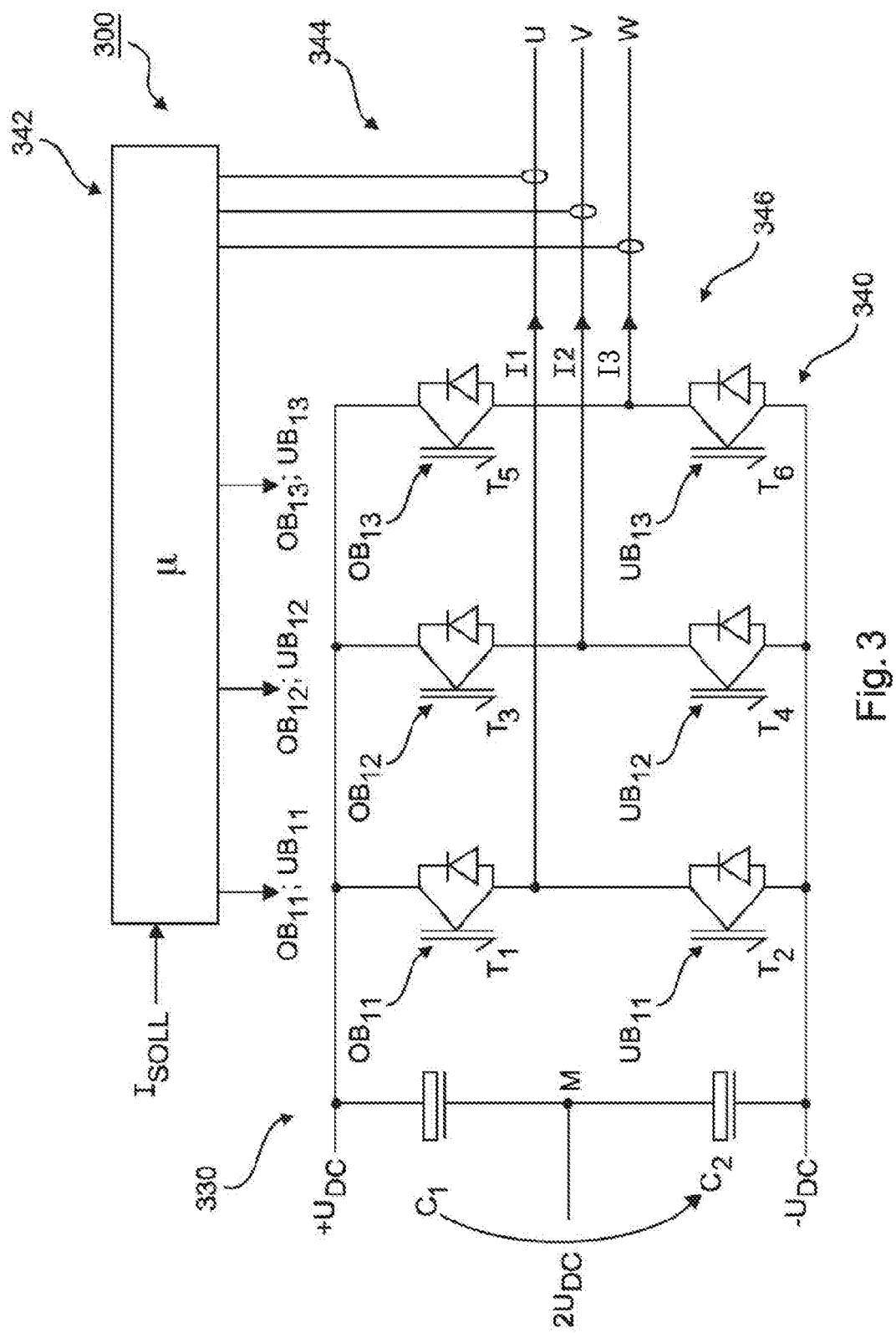

FIG. 3 schematically shows the construction 300 of an inverter for providing an inverter current by means of a tolerance band method. In particular, FIG. 3 shows part of the electrical section that is shown in FIG. 2.

The construction 300 has a DC voltage link 330 which is connected by way of a rectifier to the generator of a wind power installation. The DC voltage link 330 has a first potential $U_{DC+}$ and a second potential $U_{DC-}$ with a center tap M. Also respectively arranged between the center tap M and the two potentials $U_{DC+}$, $U_{DC-}$ is a capacitor with the capacitance $C_1$, $C_2$, in order to store energy in the DC voltage link 330 and smooth the DC voltage $2U_{DC}$ correspondingly.

The inverter 340, which is interconnected with the DC voltage link 330, generates respectively for each of the three phases U, V, W a separate current $I_1$, $I_2$, $I_3$ at the output 346 of the inverter 340. The inverter 340 respectively has for this, for each of the three phases U, V, W, an upper switch $T_1$, $T_3$, $T_5$ and a lower switch $T_2$, $T_4$, $T_6$, the upper and lower switches $T_1$, $T_2$, $T_3$, $T_4$, $T_5$, $T_6$ being activated in particular by way of the controller 342 by means of a tolerance band method.

The controller 342 itself operates with a current-controlled tolerance band method. For this, the controller 342 senses the currents $I_1$, $I_2$, $I_3$ generated or provided by the inverter 340 at the output 346 of the inverter 340 by means of a current sensor 344. The currents $I_1$, $I_2$, $I_3$ thus sensed are compared with a setpoint value Isoll, in order to determine the activation signals $OB_{11}$, $UB_{11}$, $OB_{12}$, $UB_{12}$, $OB_{13}$, $UB_{13}$ for upper and lower switches $T_1$, $T_2$, $T_3$, $T_4$, $T_5$, $T_6$.

Figure 4:
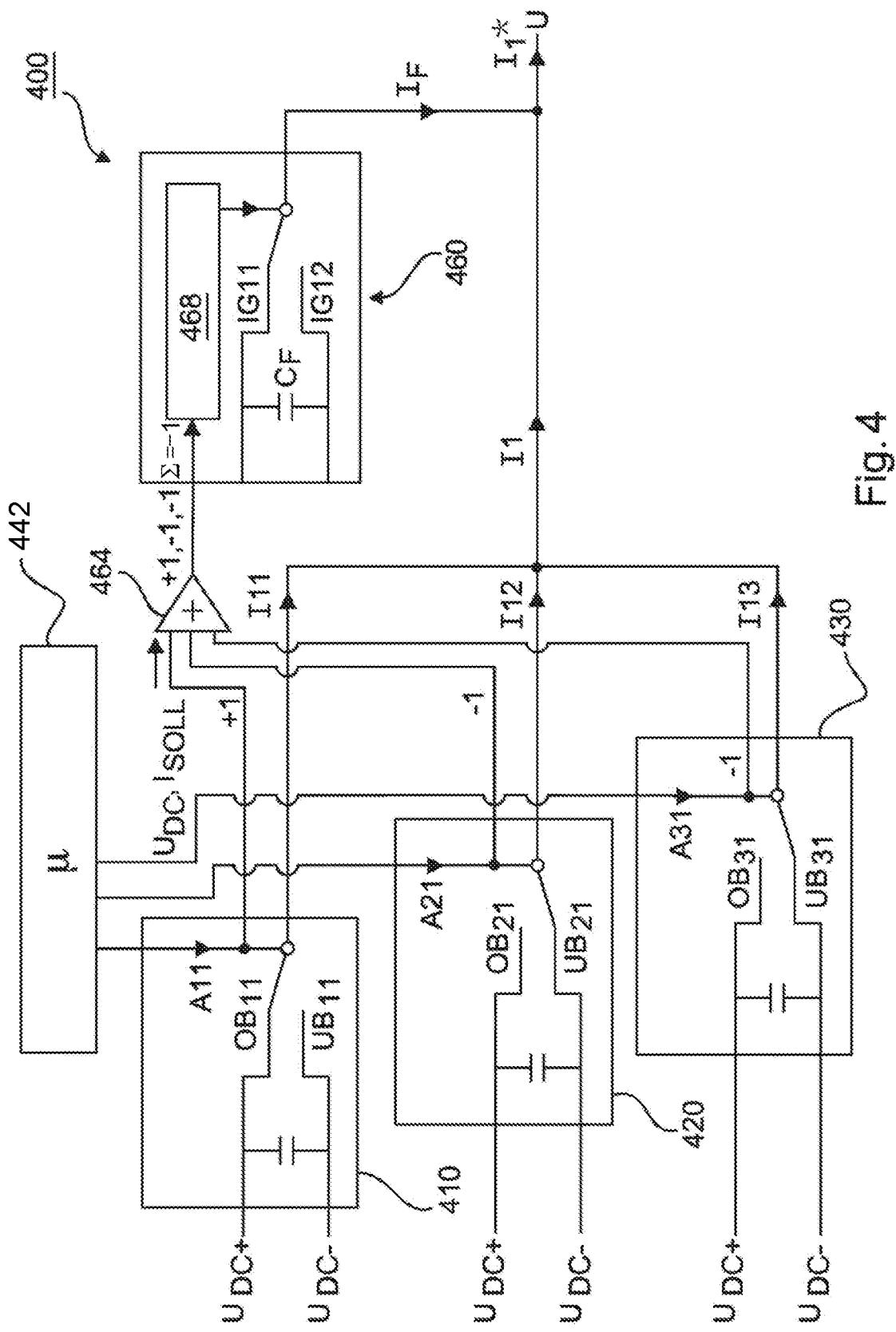

FIG. 4 schematically shows the coupling 400 of the active filter 460 to the switches $OB_{11}$, $UB_{11}$, $OB_{21}$, $UB_{21}$, $OB_{31}$, $UB_{31}$ of a number of inverter modules 410, 420, 430, the inverter module currents $I_{11}$, $I_{12}$, $I_{13}$ of which are superposed to form the inverter current $I_1$ of the phase U. FIG. 4 therefore shows a single-phase view of the phase U of a three-phase system, comprising the phases U, V and W.

The inverter modules 410, 420, 430 are respectively connected on the DC side to a DC voltage link, which is indicated by the clamping voltage $U_{DC+}$, $U_{DC-}$.

For providing the inverter module currents $I_{11}$, $I_{12}$, $I_{13}$, the individual inverter modules 410, 420, 430 are activated by means of the activation signals $A_{11}$, $A_{21}$, $A_{31}$. The activation signals $A_{11}$, $A_{21}$, $A_{31}$ in this case prescribe a corresponding switching state to the upper switches $OB_{11}$, $OB_{21}$, $OB_{31}$ and the lower switches $UB_{11}$, $UB_{21}$, $UB_{31}$.

The inverter module 410 is in this case the switching state +1, i.e., the upper switch $OB_{11}$ is active and the lower switch $UB_{11}$ is inactive.

The inverter module 420 has in this case the switching state −1, i.e., the upper switch $OB_{21}$ is inactive and the lower switch $UB_{21}$ is active.

The inverter module 430 has in this case the switching state −1, i.e., the upper switch $OB_{31}$ is inactive and the lower switch $UB_{31}$ is active.

The activation signals $A_{11}$, $A_{21}$, $A_{31}$ and also the DC link voltage $U_{DC}$ and the current setpoint value $I_{soll}$ for the inverter modules 410, 420, 430 are fed to the collective evaluation device 464, which transfers them to the control unit 468 of the active filter 460. The activation signals $A_{11}$, $A_{21}$, $A_{31}$ are transferred to the collective evaluation device 464 as switching states, to be specific in the instantaneous state that is given by way of example as the three switching states +1, −1 and −1.

The collective evaluation 464 is preferably designed for reproducing both the individual switching states of the individual inverter modules 410, 420, 430 and a collective switching state Σ of all of the inverters 410, 420, 430.

In the present case, in the instantaneous state that is given by way of example the collective switching state Σ is −1. On the basis of the collective switching state Σ, the control unit 468 of the active filter can then determine the rise of the corresponding flanks of the tolerance band method of the inverter modules 410, 420, 430 and correspondingly activate the switches of the active filter by means of the activation signal $S_F$ in such a way that the filtered alternating current $I_C$ has less harmonics than the inverter current $I_1$.

For this, the control unit 468 controls the switches $IG_{11}$, $IG_{12}$ of the active filter 460 in dependence on the three switching states +1, −1 and −1 and also the DC link voltage $U_{DC}$ and the current setpoint value Isoll by the activation signal SF, which likewise prescribes a switching state +1 for the switches $IG_{11}$, $IG_{12}$ of the active filter 460. The active filter 460 generates from this by means of a DC voltage source $C_F$ a filter current $I_F$, which is superposed with the inverter current $I_1$ to form a filtered alternating current $I*_1$.

The control of the switches $IG_{11}$, $IG_{12}$ of the active filter 460 may take place, for example, by means of a look-up table, in which the switching states of the switches $IG_{11}$, $IG_{12}$ of the active filter 460 in dependence on the switching states of the upper and lower switches $OB_{11}$, $OB_{21}$, $OB_{31}$, $UB_{11}$, $UB_{21}$, $UB_{31}$ of the inverter modules 410, 420, 430 are stored.

The look-up table may in this case be stored either in the collective evaluation device 464 or in the control unit 468 of the active filter 460. Such a look-up table, which is also referred to as a control table, is represented by way of example below in FIG. 5. The collective evaluation device 464 may be digital logic or a digital circuit, an analog circuit, a controller, a microcontroller or a microprocessor, among others. The collective evaluation device 464 may include memory for data storage and well as one or more analog or digital comparators. The collective evaluation device 464 may receive data, process the data according to a truth table and output data based on the processing. The control unit 468 may be a controller, a microcontroller or a microprocessor, among others.

Figure 5:
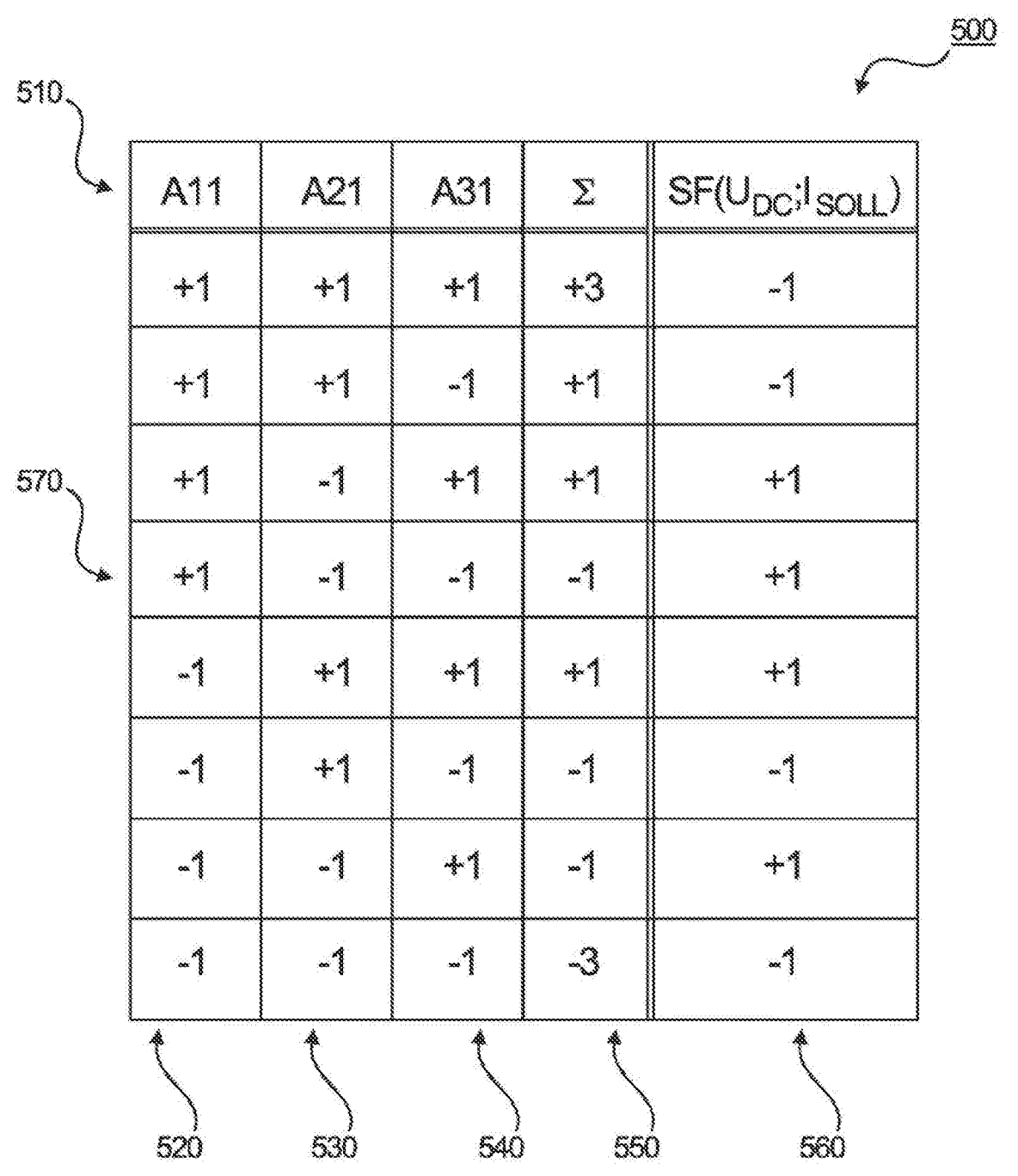

FIG. 5 schematically shows a control table 500 of a collective evaluation device. In particular, FIG. 5 shows here a control table of the collective evaluation device 464 shown in FIG. 4.

Entered in the top row 510 are the activation signals $A_{11}$, $A_{21}$, $A_{31}$ of the upper and lower switches, the collective switching state Σ and the activation signal $S_F$ of the active filter.

The individual columns 520, 530, 540, 560 also have the corresponding switching states of the activation signals $A_{11}$, $A_{21}$, $A_{31}$, $S_F$. The column 550 reproduces the corresponding collective switching state Σ.

Corresponding to FIG. 4, the row 570 shows that the activation signals $A_{11}$, $A_{21}$, $A_{31}$, which comprise the switching states +1, −1 and −1, have the effect that the switching state +1 is transmitted to the switches of the active filter.

For a simplified representation, it has been assumed here that the DC link voltage $U_{DC}$ and the current setpoint value $I_{soll}$ are constant and have no influence on the values of the table. In a preferred embodiment, however, they are taken into account, which is indicated by $S_F(U_{DC}, I_{soll})$. The control table would then have to be correspondingly supplemented by adding the columns for the DC link voltage $U_{DC}$ and the current setpoint value $I_{soll}$.

The invention claimed is:

1. A method for feeding a filtered alternating current into an electrical supply grid by a wind power installation, comprising:
providing, at an inverter output of an inverter of the wind power installation, an inverter current by switching at least one switch of the inverter;
sensing a switching state of the at least one switch of the inverter; and
controlling an active filter, coupled to the inverter output, based on the sensed switching state to filter the inverter current provided at the inverter output and producing the filtered alternating current for feeding into the electrical supply grid.

2. The method for feeding the filtered alternating current as claimed in claim 1, wherein controlling the active filter includes:
reducing a harmonic component of the filtered alternating current compared with the inverter current.

3. The method for feeding the filtered alternating current as claimed in claim 1, comprising:
switching the at least one switch according to a switching frequency; and
sensing the switching state of the at least one switch according to a sampling frequency that is at least twice the switching frequency.

4. The method for feeding the filtered alternating current as claimed in claim 1, comprising:
controlling the active filter based on an activation signal initiating the switching of the at least one switch; or
controlling of the active filter based on a control voltage initiating the switching of the at least one switch.

5. The method for feeding the filtered alternating current as claimed in claim 1, comprising:
activating the inverter using a tolerance band method to provide the inverter current at the inverter output, wherein the active filter filters the inverter current based on the switching state of the at least one switch by the tolerance band method.

6. The method for feeding the filtered alternating current as claimed in claim 1, further comprising:
switching the at least one switch using a tolerance band method that is based on the inverter current provided at the inverter output; and
controlling the active filter based on the sensed switching state without taking into account the inverter current provided at the inverter output.

7. The method for feeding the filtered alternating current as claimed in claim 1, comprising:
controlling of the active filter based on the sensed switching state to reduce at least one harmonic component of the inverter current, minimize a current harmonic component of the inverter current, or reduce a current harmonic component of one of a 1st current harmonic to a 60th current harmonic.

8. The method for feeding the filtered alternating current as claimed in claim 1, wherein:
the inverter includes a plurality of inverter modules having a respective plurality of inverter module outputs for providing a plurality of inverter module currents, respectively, and the plurality of inverter module outputs are interconnected such that their respectively plurality of inverter module currents are superposed to form the inverter current; and
a collective evaluation device senses and evaluates a plurality of activation signals of the plurality of inverter modules, respectively, and the collective evaluation device activates the active filter for filtering the inverter current.

9. The method for feeding the filtered alternating current as claimed in claim 1, comprising:
controlling the active filter based on at least one direct current (DC) link voltage of the inverter or a current setpoint value for the inverter.

10. A wind power installation, comprising:
an inverter with an inverter output for providing an inverter current; and an active filter, coupled to the inverter output, for filtering the inverter current to produce a filtered alternating current for feeding into an electrical supply grid, the active filter being configured to be controlled based on sensed switching state of at least one switch of the inverter to filter the inverter current and thereby produce the filtered alternating current.

11. The wind power installation as claimed in claim 10, comprising:
   a controller for controlling the inverter to provide, at the inverter output, the inverter current by switching the at least one switch.

12. The wind power installation as claimed in claim 10, wherein the inverter has at least six switches, and wherein two switches including an upper switch and a lower switch are switched to provide a current for each phase of the inverter current.

13. The wind power installation as claimed in claim 10, wherein the at least one switch of the inverter is an insulated-gate bipolar transistor (IGBT) or a metal oxide semiconductor field-effect transistor (MOSFET).

14. The wind power installation as claimed in claim 10, wherein the inverter is activated using a tolerance band method and the active filter filters the inverter current based on the switching state of the at least one switch generated by the tolerance band method.

15. The wind power installation as claimed in claim 10, comprising:
   a full power converter including the inverter as an inverter portion of the full power converter.

16. The wind power installation as claimed in claim 10, wherein the active filter has at least one active component that is at least one IGBT or one MOSFET configured to operate with a clocking frequency that is greater than a switching frequency of the at least one switch or greater than a switching frequency of multiple switches multiplied by a number of inverter modules of the inverter.

17. The wind power installation as claimed in claim 10, wherein:
   the inverter includes a plurality of inverter modules having a respective plurality of inverter module outputs for delivering a plurality of inverter module currents, respectively and the plurality of inverter module outputs are interconnected in such that the plurality of inverter module currents are superposed to form the inverter current; and
   the wind power installation includes a collective evaluation device configured to sense and evaluate activation signals of the plurality of inverter modules and activate the active filter for filtering the inverter current.

18. The wind power installation as claimed in claim 10, wherein the active filter has an output coupled to the inverter output, and wherein the active filter operates on the inverter output to reduce at least one current harmonic of the inverter current.

* * * * *